(12) United States Patent
Guebre-Tsadik et al.

(10) Patent No.: US 6,216,746 B1
(45) Date of Patent: Apr. 17, 2001

(54) LAY-IN WIREWAY

(75) Inventors: Anteneh Guebre-Tsadik, Coon Rapids; Bryon Keith Jorgenson, Lino Lakes, both of MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 0 days.

(21) Appl. No.: 09/498,148

(22) Filed: Feb. 4, 2000

(51) Int. Cl.[7] ......................................................... F16L 9/22
(52) U.S. Cl. ........................ 138/155; 138/158; 285/121; 174/68
(58) Field of Search ................................. 138/155, 120, 138/157, 158, 159, 106–108; 285/121; 174/68, 101

(56) References Cited

U.S. PATENT DOCUMENTS

| | | | |
|---|---|---|---|
| 753,714 | 3/1904 | Krantz | 138/108 |
| 1,473,290 | 11/1923 | Hammer | 220/836 |
| 1,799,876 | 4/1931 | Travis | 29/270 |
| 1,813,331 | 7/1931 | Wadsworth | 138/89 X |
| 1,986,965 | 1/1935 | Frank | 138/157 X |
| 1,992,574 | 2/1935 | Jenkins | 138/156 X |
| 2,023,433 | 12/1935 | McConnell | 174/50 |
| 2,332,017 | 10/1943 | Sedgwick | 220/3.8 |
| 2,353,121 | 7/1944 | Adam et al. | 138/159 X |
| 2,445,198 | 7/1948 | Wiesmann | 174/99 R |
| 2,714,424 | 8/1955 | Atkinson | 138/158 X |
| 2,917,083 | 12/1959 | Duvall et al. | 138/157 X |
| 2,921,607 | 1/1960 | Caveney | 138/106 |
| 2,956,587 | 10/1960 | Fisher | 138/107 X |
| 3,003,797 | 10/1961 | Gage | 277/530 |
| 3,070,689 | 12/1962 | McIntosh | 362/362 |
| 3,243,503 | 3/1966 | Burley | 138/159 |
| 3,312,251 | 4/1967 | Marks et al. | 138/158 |
| 3,331,916 | 7/1967 | George et al. | 138/164 |
| 3,338,599 | 8/1967 | Hallman | 138/158 |
| 3,351,699 | 11/1967 | Merckle | 138/157 X |
| 3,370,121 | 2/1968 | Merckle | 138/164 X |
| 3,562,402 | 2/1971 | Dwyer | 138/164 X |
| 3,570,546 | 3/1971 | Jackson | 138/155 |
| 3,633,628 | 1/1972 | Duquette et al. | 138/116 |
| 3,636,984 * | 1/1972 | Rauhauser | 138/158 X |
| 3,874,550 | 4/1975 | Gordon | 138/92 X |
| 4,040,449 | 8/1977 | Butler et al. | 138/92 |
| 4,077,434 * | 3/1978 | Sieckert et al. | 138/158 X |
| 4,349,220 | 9/1982 | Carroll et al. | 138/155 X |
| 4,398,564 | 8/1983 | Young et al. | 138/92 |

FOREIGN PATENT DOCUMENTS

| | | |
|---|---|---|
| 205732 | 12/1956 | (AU) . |
| 614800 | 2/1961 | (CA) . |
| 657888 | 2/1963 | (CA) . |
| 517209 | 1/1940 | (GB) . |
| 549840 | 12/1942 | (GB) . |
| 685964 | 1/1953 | (GB) . |

OTHER PUBLICATIONS

"Industrial Wireway and Trough" catalog pages, Hoffman Engineering Company pp. 8.00–8.21 (1997).
"Lay–In I Wireway" catalog pages, Hoffman Engineering Company, pp. 7.08–7.17 (1997).
"Wireway" and "Raintight Wireway", *Square D*, 10 pgs. (Mar. 1993).

* cited by examiner

*Primary Examiner*—Patrick Brinson
(74) *Attorney, Agent, or Firm*—Schwegman, Lundberg, Woessner & Kluth, P.A.

(57) ABSTRACT

A lay-in wireway includes channel members connected in an end-to-end configuration to form an enclosed rectangular channel. Covers hingedly connect to a flange extending from one side of the wireway. Hinges are then formed with the cover member and act as a stop to hold the cover member at an open position. Channel members connect with a hook and slot arrangement which slide relative toward one another at an end connector portion. Hooks and slots provide self-alignment of connected channel members when slid into position.

21 Claims, 11 Drawing Sheets

LAY-IN WIREWAY

BACKGROUND OF THE INVENTION

1. Field of the Invention

The present invention relates to a lay-in wireway, and in particular to an easy to assemble covered wireway.

2. Prior Art

Wireways are well known and used in a variety of industrial type environments. Wireways receive cables, wiring and other lines to protect them from air laden with dust and other harmful compounds that may damage the components if not protected. In some applications, it is absolutely necessary that the wireway be sealed and fluid-tight to protect the lines which are placed in the wireways. However, depending on the use and the environment, it is not always necessary to provide a fluid-tight sealed wireway. Some environments require covering the wiring, but other lines do not necessarily need a fluid-tight seal.

An example of a fluid-tight wireway is shown in U.S. Pat. No. 4,398,564. Although this wireway does an excellent job of providing a sealed conduit, it may require extensive assembly time in joining sections and installing the gaskets and other seals necessary to make the wireway fluid-tight. In addition to being more expensive and complicated, the on-site installation time and associated costs may render it a poor choice for some applications. As many installations may require a network of wireways covering great distances, the time and cost of such wireways may be substantial.

Wireways that may not provide the degree of sealing shown in U.S. Pat. No. 4,398,564 are also known. However, such wireways typically include many bolts, screws or other mounting hardware to join individual sections together to create an extended wireway. The time and effort spent in joining the sections may be substantial. Moreover, the wireways typically include added mounting hardware for pivotally mounting the cover.

It can be seen then, that a new improved wireway system is needed. Such a system should provide for a simple design that provides protection from water in industrial and other environments. In addition, such a system should provide a relatively simple design with a minimum number of parts that is quickly and easily installed. Such a wireway should also provide a degree of flexibility for hingedly mounting the cover in a simple manner that allows for orienting the wireway in more than one position for either top loading or front loading. The present invention addresses these, as well as other problems commonly associated with covered lay-in wireways.

SUMMARY OF THE INVENTION

The present invention is directed to a lay-in wireway, and in particular to a wireway having simple construction with easy assembly providing a protection of wiring in outdoor installations against rain and snow or in indoor installations against dripping water.

The wireway of the present invention includes sections that are joined in an end-to-end configuration to form an extended wireway. The sections include channel members with cover members hingedly mounted thereto. The channel members include a front side, bottom sides, and rear side to form a substantially rectangular channel. The front and rear sides include flanges extending laterally outward and angled downward from each edge. The cover members include a center planar portion and angled portions extending over the flanges with a hinge formed in a first angled portion and the rear flange. A retainer device on the front side engages a slot at the front of the cover members. In some embodiments, alternating ones of the cover members include end portions which overlap onto the end of the next adjacent cover member to form a continuous cover.

The channel members are easily connected by sliding complementary engagement members together. The first end of each channel member includes a connector portion with an outer overlapping section extending to receive an opposite end of an adjacent channel member. The connector portion includes slots formed at an upper edge which receive hooks from the opposite end of the channel member. The second end of the first channel member includes tabs or hooks that slide downward onto the end of the second channel member having slots, so that the channel members are connected and self-aligned. The bottom of the channel members include depressions for spacing the wireway apart from adjacent surfaces and to align with depressions formed in the connector portion. The channel members may also include one or more orifices formed in one of the sides and the bottom receiving connecting hardware to provide a more secure connection and/or for drainage, as may be required.

The cover member hinge includes a first section extending obliquely to the angled portion of the cover and the second section extending rearward and downward relative to the first section. The hinge extends through a slot formed in the flange of the channel member and can be inserted and removed by sliding the hinge outward away from the cover member. When pivoted to an open position, the second section of the hinge engages the side of the channel member to limit further rotation. The hinge also acts as a stop to maintain the cover members in a substantially vertical position when oriented with the open side of the channel member facing upward or in a substantially vertical position when oriented with the open side facing horizontally. The present invention provides for an integral cover member and hinge that does not require additional hardware for mounting to the integrally formed channel member. The cover and hinge are easily assembled without additional hardware and are self-aligning without additional mounting hardware.

These features of novelty and various other advantages which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

Referring now to the drawings wherein like reference letters and numerals indicate corresponding elements throughout the several views.

DETAILED DESCRIPTION

Figure 1:
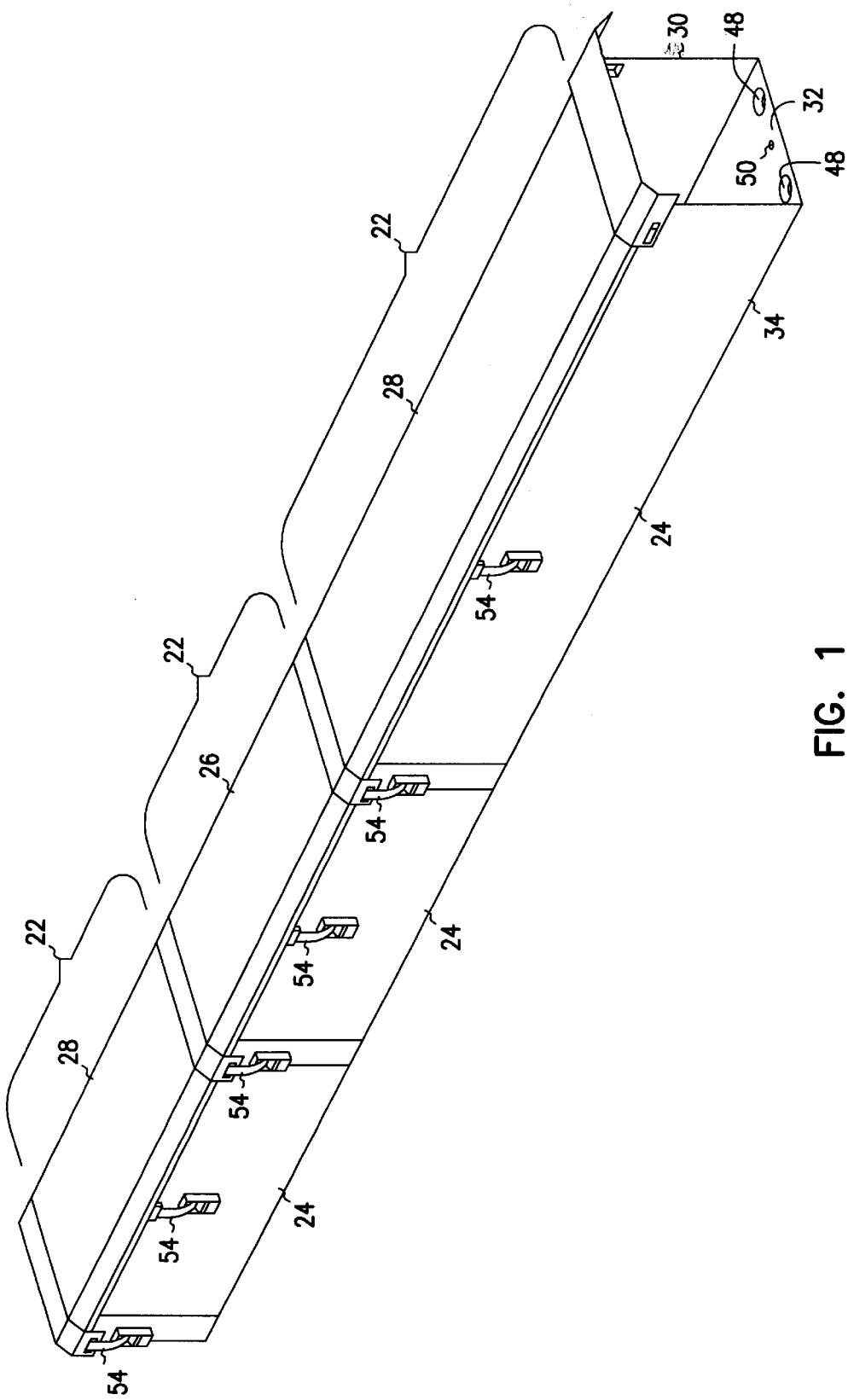
FIG. 1 is a perspective view of a wireway device with the cover closed according to the principles of the present invention.
Figure 2:
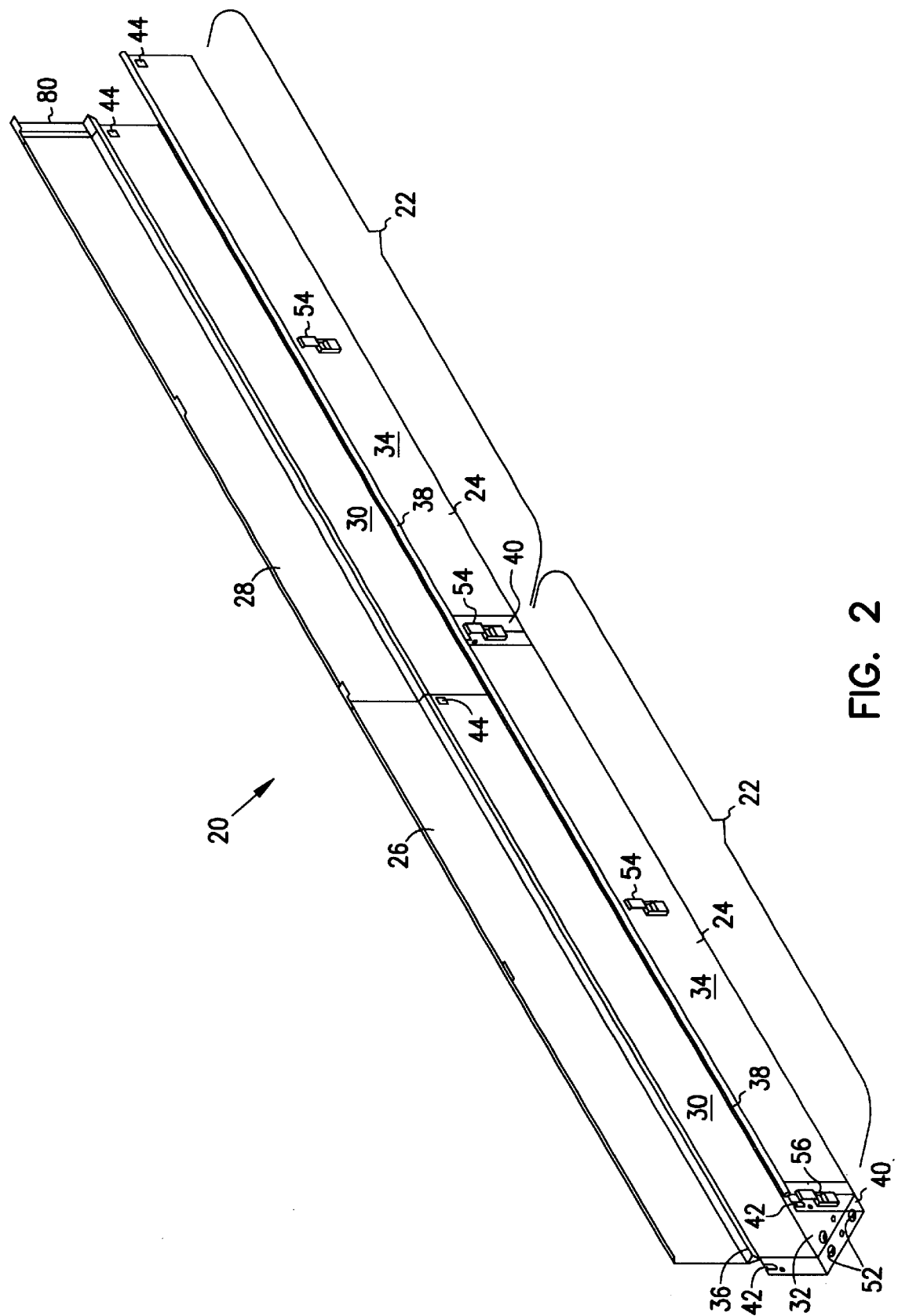
FIG. 2 is a perspective view of the wireway of FIG. 1 with the cover in an open position.
Figure 3:
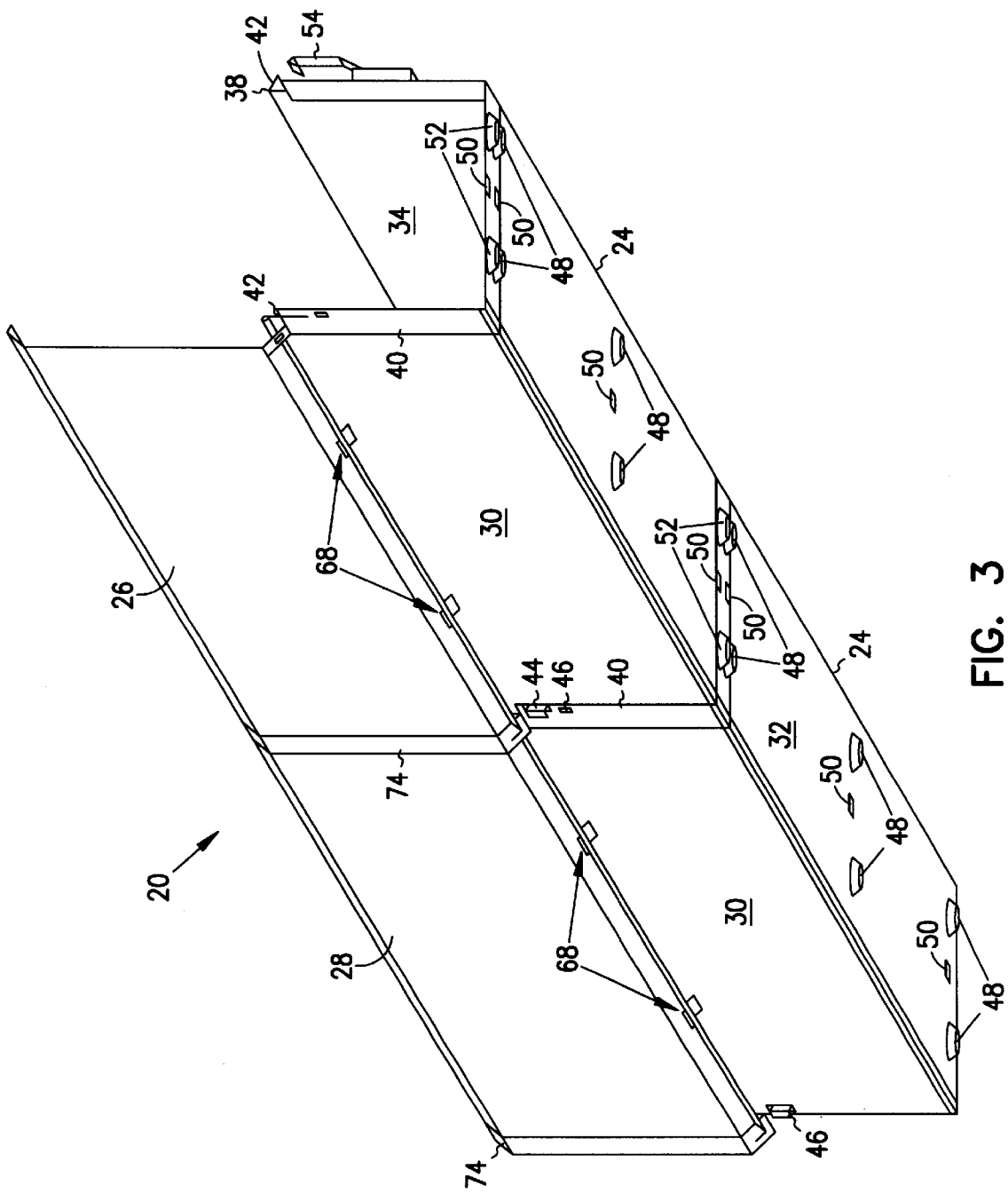
FIG. 3 is a bottom rear perspective view of a portion of the wireway shown in FIG. 1.

Referring now to the drawings, and in particular to FIGS. 1–3, there is shown a lay-in wireway, generally designated 20. The wireway 20 includes a number of sections, designated 22, joined end to end to form an extended closed wireway 20. Although the sections 22 are shown as being substantially the same length, it can be appreciated that other lengths may be used and different length sections 22 may be combined to achieve the desired length. Each of the sections 22 includes a channel member 24 and a cover member 26 or 28. Cover members 26 and 28 are complementary and alternated to form a continuous cover, as explained hereinafter and are hingedly connected to the channel members 24 to provide easy placement and access to the interior of the wireway for laying wiring and other lines in the wireway 20.

Figure 4:
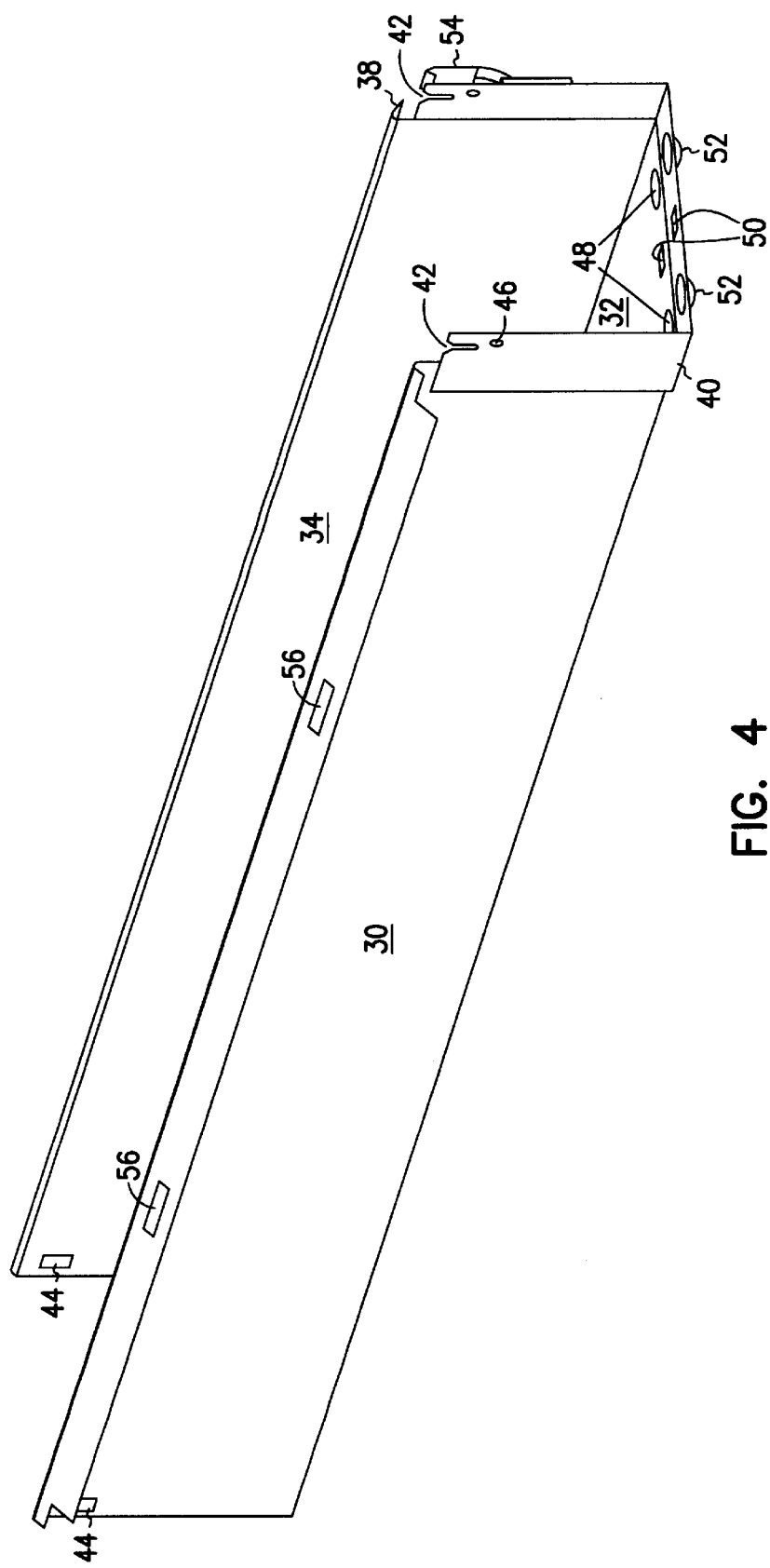
FIG. 4 is a perspective view of a channel member for the wireway shown in FIG. 1.
Figure 5:
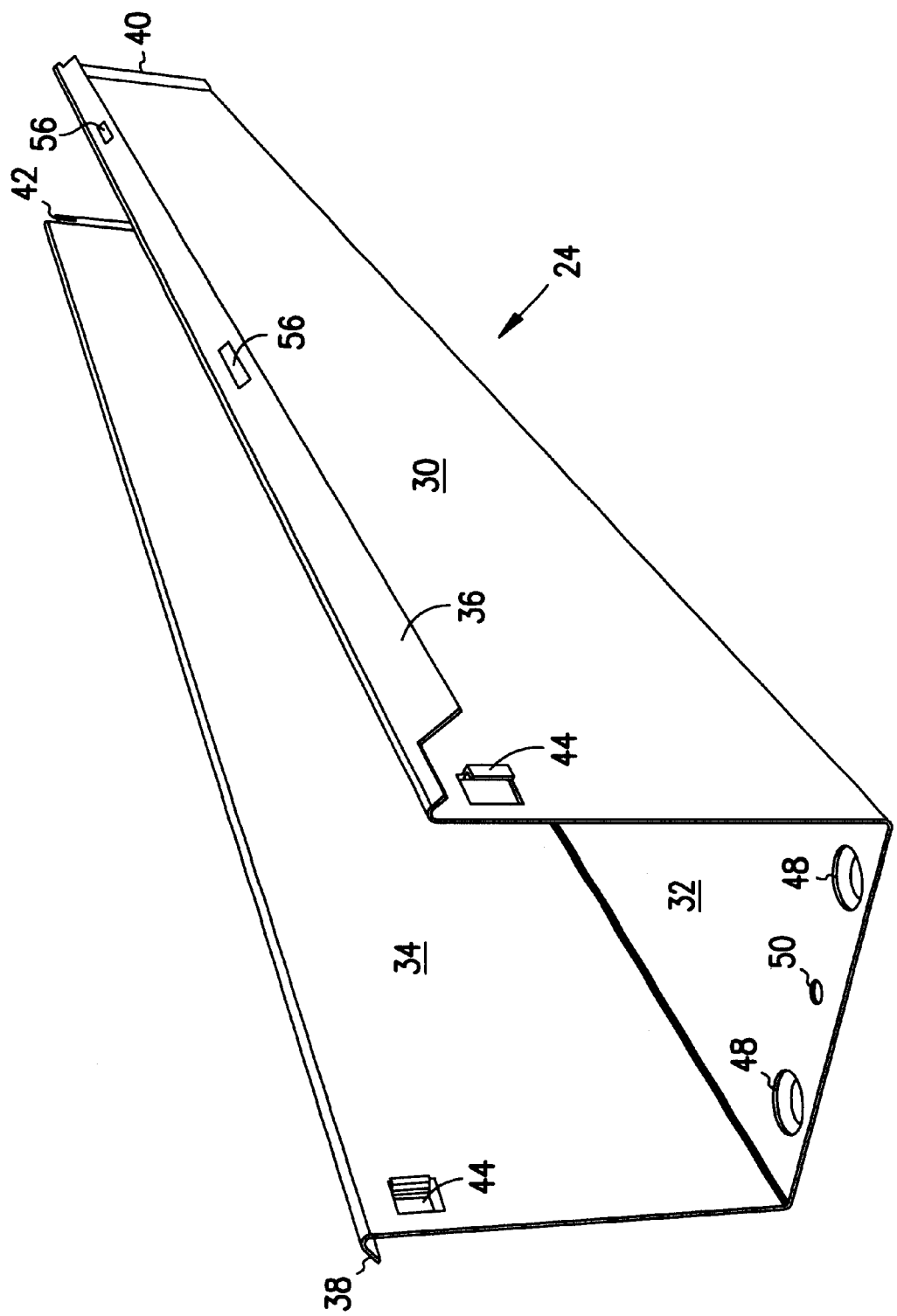
FIG. 5 is a perspective view from a second end of the channel member shown in FIG. 4.

Referring now to FIGS. 4 and 5, there is shown one of the wireway channel members 24. Each of the channel members 24 is substantially similar, although different lengths and channel dimensions may be utilized to meet the criteria for the wireway. The channel member 24 is preferably substantially rectangular in cross section including a rear wall 30, a bottom wall 32 and a front wall 34. The front and rear are designated for reference only when the wireway 20 is positioned for top loading. The wireway 20 may also be oriented with the bottom wall 32 and the cover members 26 and 28 extending vertically and the rear and front walls 30 and 34 extending horizontally for front loading. Flanges 36 and 38 improve the alignment and fit between the channel member 24 and the covers 26 and 28 (not shown in FIGS. 4 and 5), as explained hereinafter. The bottom of the channel members 24 may include a bottom center hole 50 and depressions 48 with drainage holes formed therein. In some embodiments, the bottom hole 50 may be utilized for insertion of a bolt or screw for joining the sections 22 together. It also provides for drainage if oriented as shown in FIGS. 4 and 5. The depressions 48 provide for spacing the bottom side 32 away from adjacent surfaces and also alignment between the joined sections.

At a first end of the channel member 24 is a connector portion 40 having a complementary offset profile configured for receiving the opposite end of an adjacent channel member 24. The connector portion 40 includes bottom depressions 52 configured for receiving and nesting with depressions 48 at the opposite end of an adjacent channel member 24. The depressions 48 and 52 include holes at the bottom of the depression for mounting to a wall or bracket, as well as for drainage, and connection and alignment to adjacent channel members 24. An orifice 46 formed through the connector portion 40 provides for joining sections 22 if an odd length is needed and/or drainage if the orientation of the wireway is changed to front loading. Slots 42 extend downward from an upper portion of the connector portion 40. The upper portion above the slots 42 is removed to allow the flanges of connected channel members 24 to extend continuously. The opposite end of each channel member 24 is stamped to form tabs or hook members 44 extending outward from the front and back sides 34 and 30. The hook type members 44 slide into the complementary slots 42 of an adjacent channel member 24, as explained hereinafter.

Flange 36 at the rear wall 30 includes one or more slots 56 receiving a hinge from the cover members. A buckle type retainer device 54 is placed along the front wall 34 and engages slots from the front portion of the covers to maintain the covers in a closed position.

Figure 6:
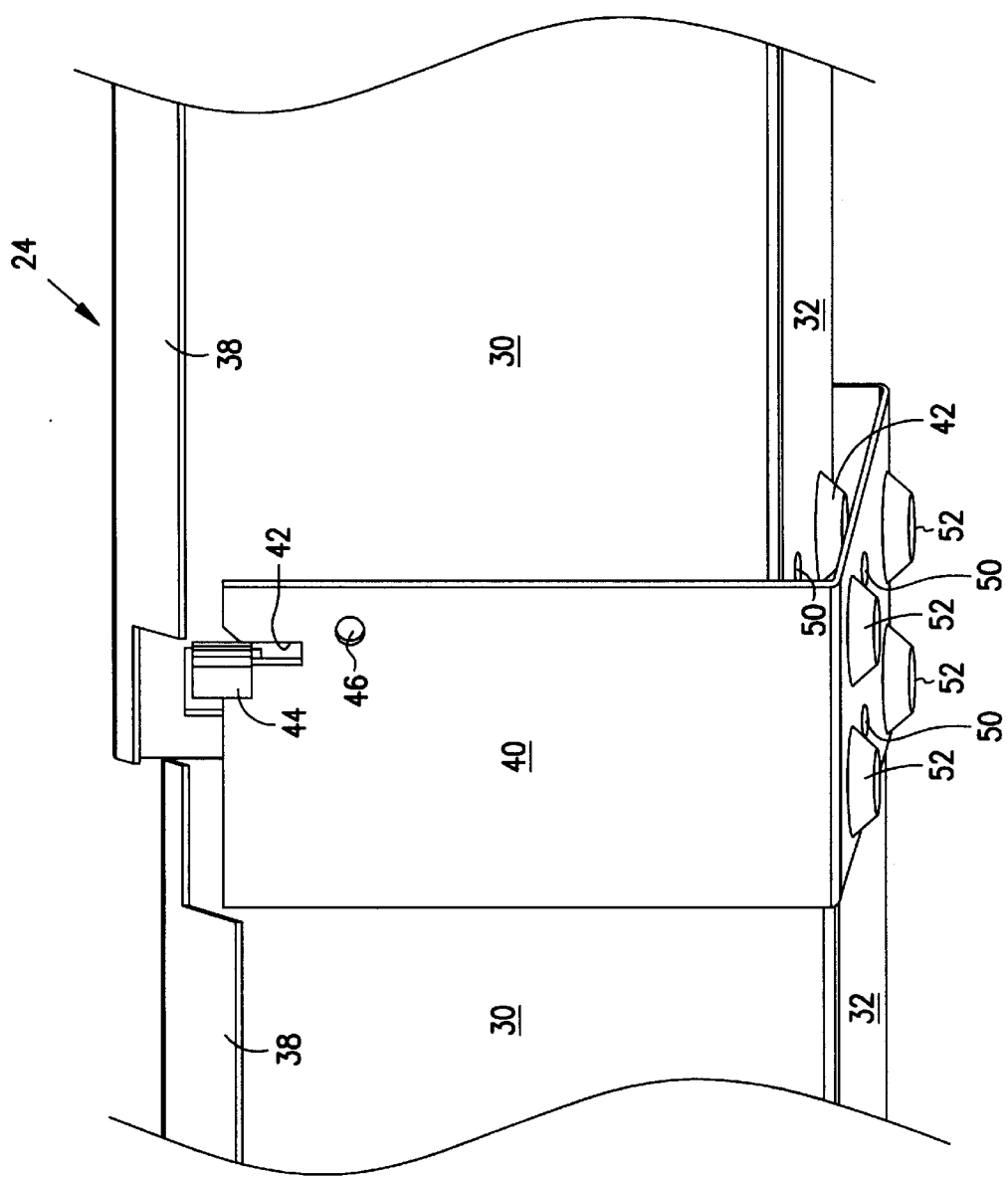
FIG. 6 is a detail view of the connection of two channel members.

Referring to FIG. 6, the connection of adjacent channel members 24 is shown. Assembly is easily accomplished by taking an end of a first channel member 24 and aligning it so that its hooks 44 slide into the slots 42 of the opposite end of a second adjacent channel member 24. The hooks 44 are simply slid downward until engaging the bottom of the slots 42 and the depressions 42 engage the depressions 52. With the connector portion 40 offset, the interior of the wireway is continuous along each of the walls 30, 32 and 34. The connection elements 42 and 44 along with the depressions 48 and 52 provide for self-alignment upon connection of the channels members 24. In some configurations, a single screw or bolt may be placed through the holes 46 and/or 50 of the connector portion to provide a more secure connection between the wireway sections.

Figure 7:
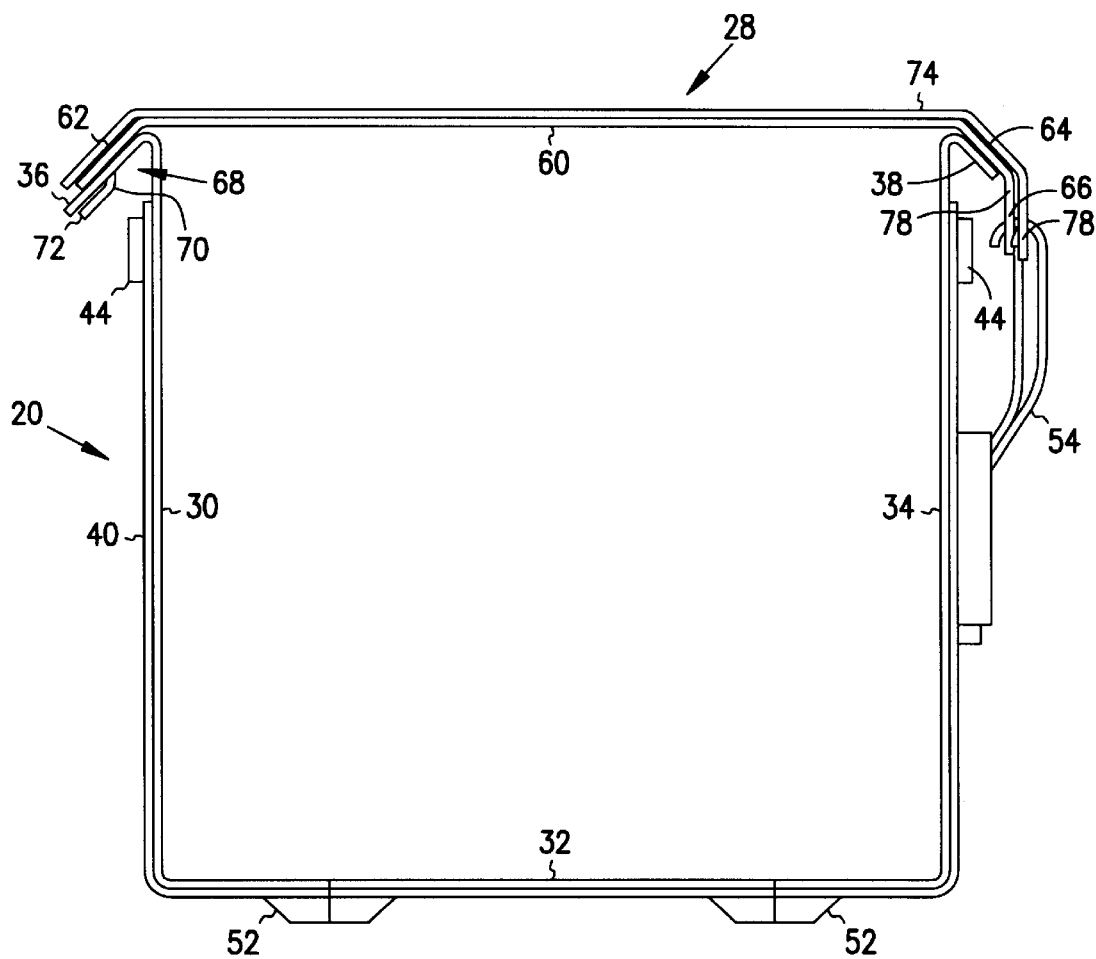
FIG. 7 is an end view of the wireway with the cover in a closed position.
Figure 8:
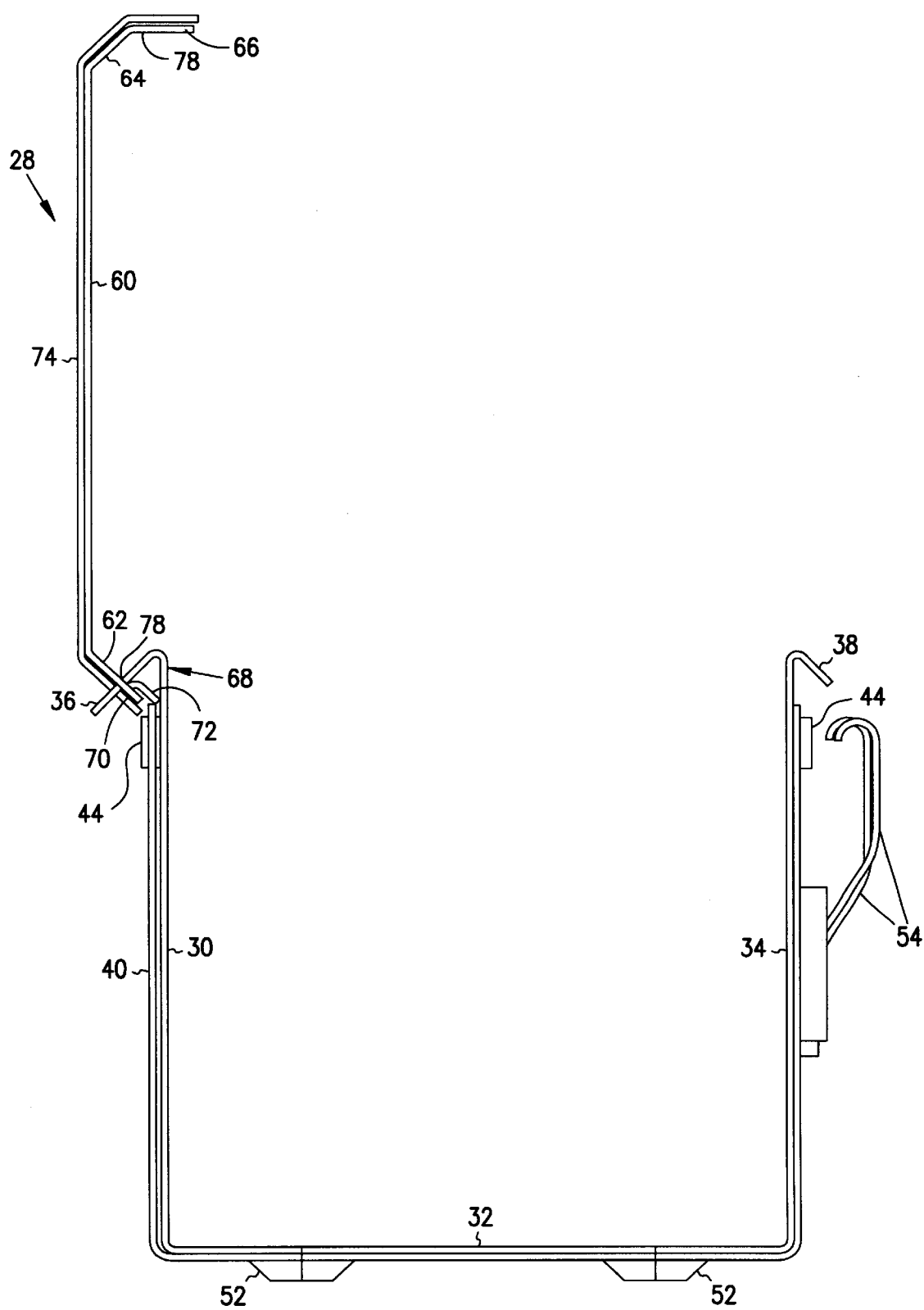
FIG. 8 is an end view of the wireway with the cover in an open position.
Figure 9:
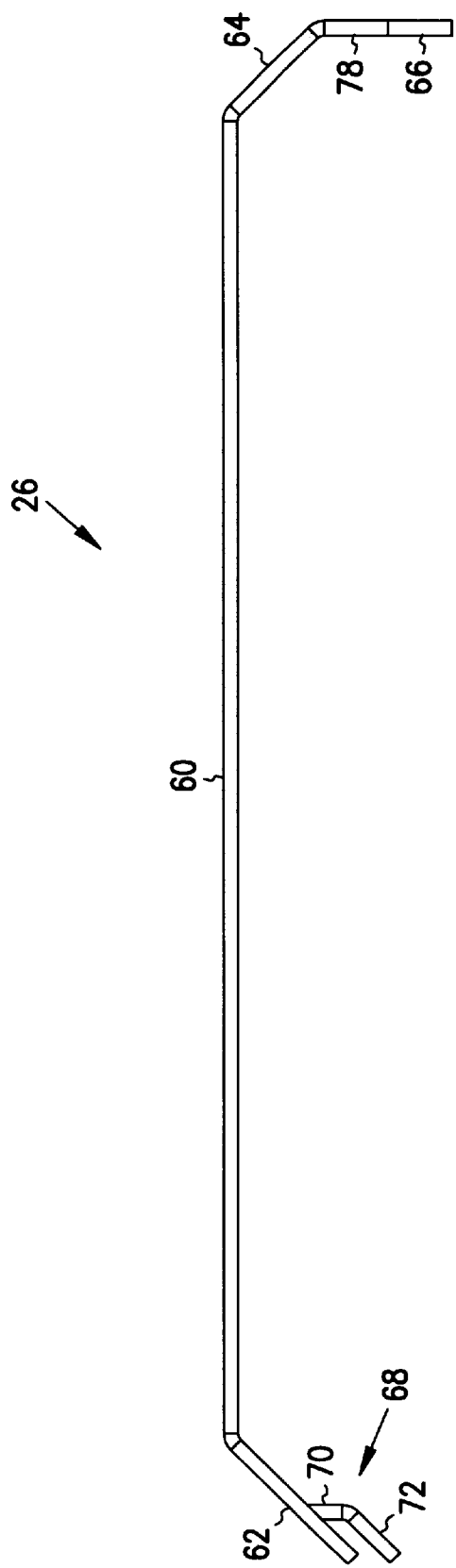
FIG. 9 is an end view of a first wireway cover member for the wireway shown in FIG. 1.
Figure 10:
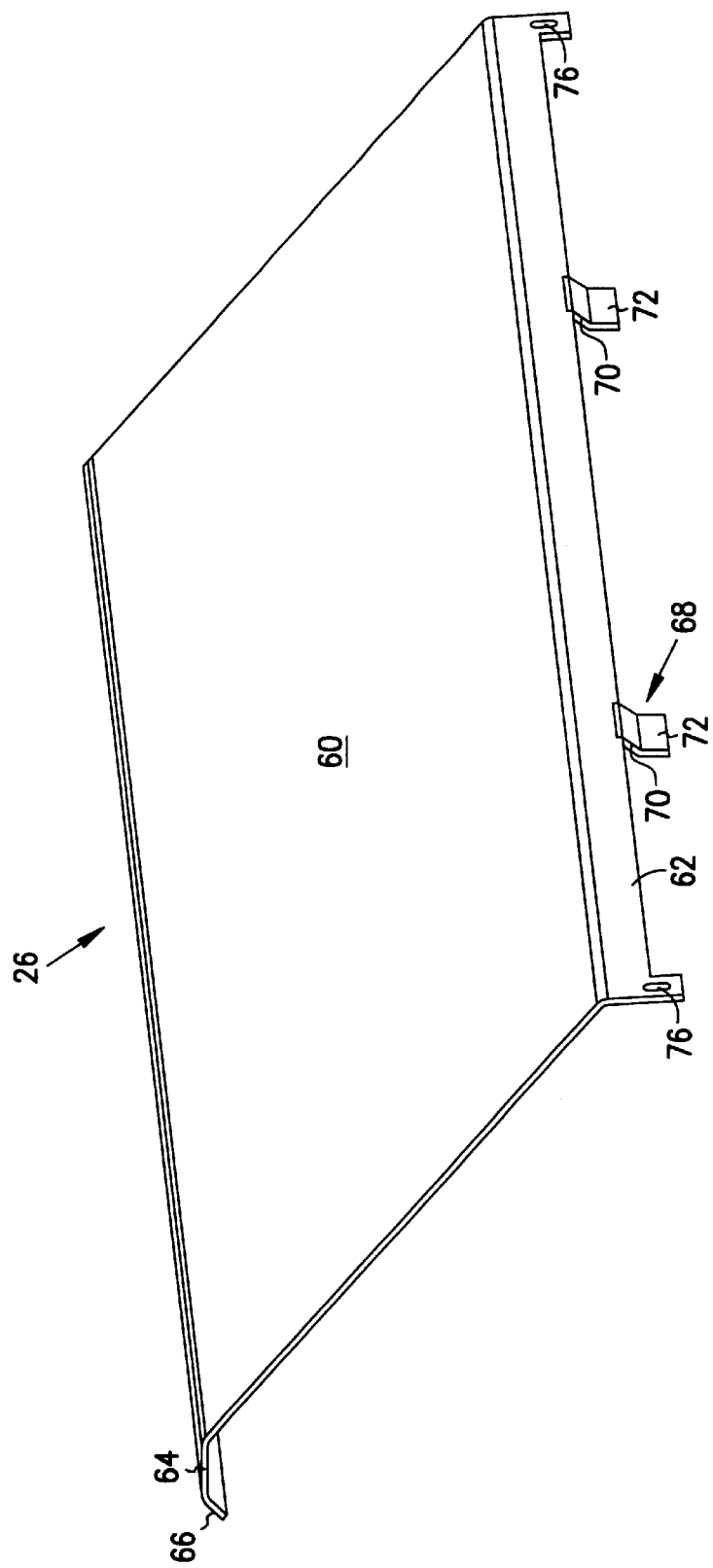
FIG. 10 is a perspective view of the first cover member shown in FIG. 9.
Figure 11:
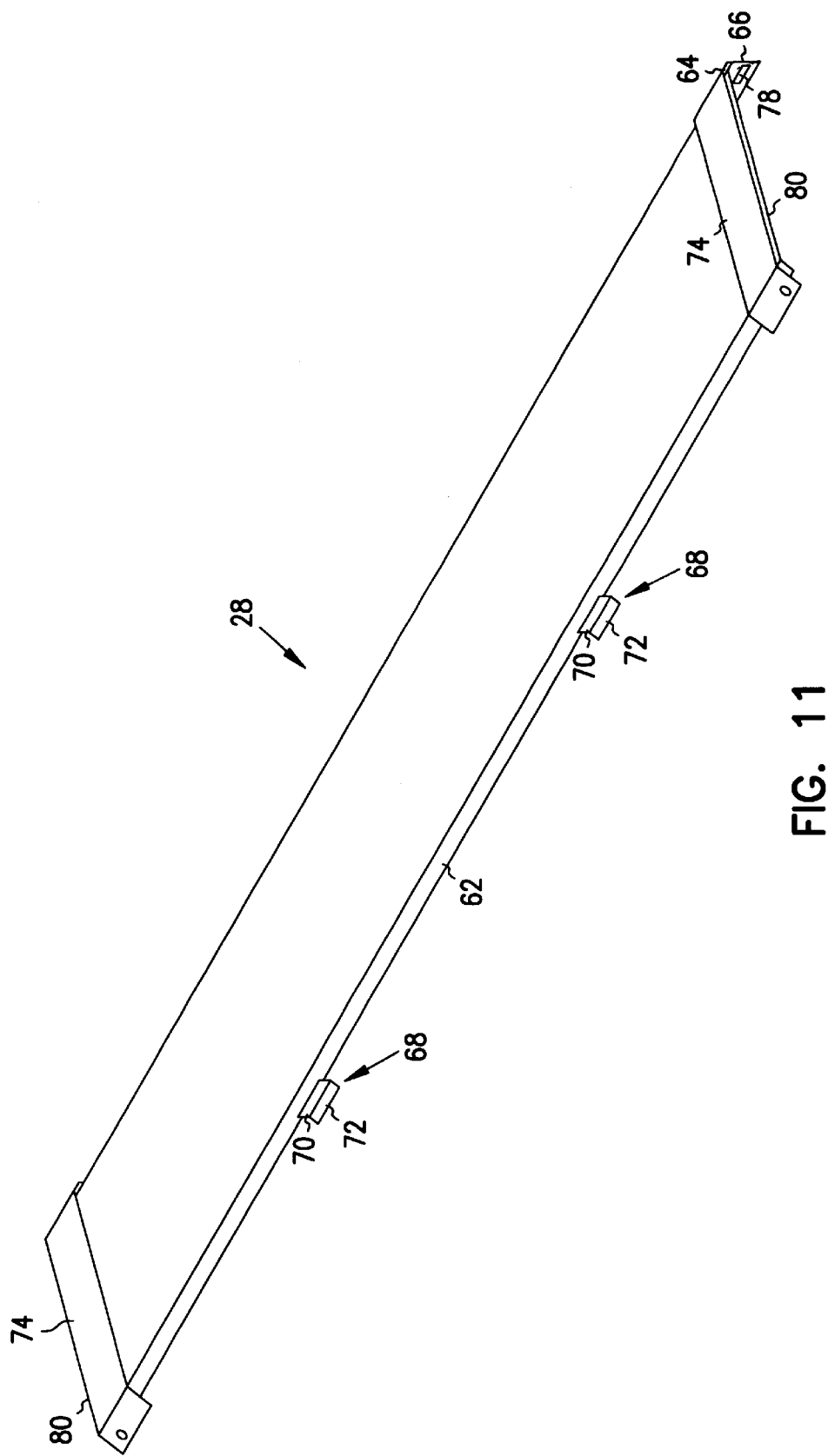
FIG. 11 is a perspective view of a second cover member for the wireway shown in FIG. 1.

Referring now to FIGS. 7–9, each of the cover members 26 and 28 includes a substantially planar portion 60, typically substantially equal to the length of a channel member 24. An angled portion 62 extends rearward and downward from the rear edge of the planar portion 60. Similarly a second angled portion 64 extends forward and downward from a front edge of the planar portion 60 with an extended cover portion 66 extending yet further downward to extend along the front of the channel member 24. A slot 78 in the extended portion 66 receives a clasp of the retainer 54, as explained hereinafter, for securing the cover in the closed position. The extended portion 66 provides coverage over and beyond the flange 38 when the wireway is oriented for front loading. A hinge 68 includes a first section 70 and second section 72. The first section 70 extends substantially downward from the rear angled portion 62 and perpendicular relative to the planar portion 60, but obliquely from the angled portion 62. The second section 72 extends downward and rearward at an obtuse angle to the first section 70. As shown in FIG. 11, the cover members 28 also include an overlapping portion 74 which may be connected to tab portion 76 of the cover members 26, shown in FIG. 10. As shown in FIGS. 2 and 11, gaskets 80 may provide an improved seal between the overlapping portions of the cover members 26 and 28. Hardware may be used to secure the sections 22 so that an extended cover providing an improved seal is achieved, as shown in FIGS. 1–3. A plurality of hinges 68 and slots 78 are formed to provide sufficient support for the covers 26 and 28 and closure along the length of the entire wireway.

As shown in FIG. 7, when closed, the angled portions 62 and 64 substantially cover the flanges 36 and 38, respectively. In addition, the hooks of the retainer devices 54 extend through either the extended portion 66 or the corresponding position on the overlapping portion 74 to secure the covers 26 and 28 to the channel member 24. The hinge 68 extends through slots 56, shown more clearly in FIG. 4 to provide simple assembly between the cover members 26 and 28 and the channel members 24.

Referring to FIG. 8, the hinge 68 is configured so that when open, the covers 26 and 28 will stay in a substantially open position. The second section 72 of the hinge 68 engages the rear wall 30 of the channel member 24 when opened and acts as a stop. It can be appreciated that if it is desired to remove the covers 26 or 28, the channel member 24 and cover members are slid apart relative to one another along the first section 70 of the hinge 68 and then along the second section 72 outward through the slots 56. The cover members are assembled by simply inserting the hinges 68 into the slots 56 until achieving the fully open position shown in FIG. 8. At this position, the hinge 68 extends through the slot and rests on the flange 36 with the second section 72 engaging the outside of the channel member 24 so that the cover member is supported and retained in the open position. Complete closure is easily accomplished by pivoting the cover members 26 and 28 downward and then engaging the retainer devices 54. Although buckles are shown, other retainers may be used in some embodiments, while in other applications it may not be necessary to utilize a retainer device, depending on the sealing requirements for the wireway.

Moreover, if the wireway 20 is oriented for front loading, with an orientation rotated one quarter turn counter-clockwise from the position shown in FIGS. 7 and 8, rather than top loading, the covers 26 and 28 will be held in the open position. As the covers 26 and 28 pivot downward, the covers are supported at the bend between the first section 70 and the second section 72 on the slot in the flange 36. The second section 72 of the hinge 68 engages an underside of the rear wall 30, which is horizontal for front loading. With this configuration, the first and second sections 70 and 72 cooperate to maintain the covers 26 and 28 at an open position extending horizontally, yet supported and attached to the channel members 24. This configuration also allows the cover members 26 and 28 to be easily detached by sliding the hinge 68 out of the slot in the flange 36.

Referring again to FIGS. 1–3, the overlapping portions 74 of the cover members 28 require that the cover members 26 and 28 are assembled in an alternating fashion. With this configuration, a continuous cover is formed that extends the length of a wireway 20 and provides for opening and closing the entire cover assembly. This configuration also provides for removing or assembling the cover to the connected channel members 24 as an integral element rather than removing or connecting the wireway cover one section 22 at a time.

It is to be understood, however, that even though numerous characteristics and advantages of the present invention have been set forth in the foregoing description, together with details of the structure and fimction of the invention, the disclosure is illustrative only, and changes may be made in detail, especially in matters of shape, size and arrangement of parts within the principles of the invention to the full extent indicated by the broad general meaning of the terms in that the appended claims are expressed.

We claim:

1. A wireway comprising:
   a plurality of channel members connected end to end, each of the channel members having two sides and a bottom defining a channel, an offset first end for receiving the second end of an adjacent channel member and having a slot formed in each of the sides, tabs at the second end extending laterally outward and inserting into the slots of an adjacent channel member; a flange on each the two side portions;
   a first cover member on first alternating channel members hingedly connected to the associated first channel member;
   a second cover member on second alternating channel members hingedly connected to the associated second channel members, the second cover members having raised end portions complementary to and overlapping the first cover members.

2. A wireway, comprising:
   a plurality of channel members connected in an end to end configuration, each of the channel members having a bottom and opposed sides defining a substantially rectangular channel; wherein at least a first one of the opposed sides includes a first flange extending outward from an edge of the first side;
   one or more cover members pivotally connected to the first flange for movement between an open position and a closed position, the cover member including a hinge element extending through the first flange and engaging the first one of the opposed sides in the open position to limit rotation of the cover member.

3. A wireway according to claim 2, wherein the cover includes a planar center portion and a mounting portion extending obliquely downward from the planar center portion.

4. A wireway according to claim 3, wherein the hinge element includes a first section extending obliquely to the mounting portion and a second section extending obliquely from the first section.

5. A wireway according to claim 2, further comprising a retainer mounted on a second one of the opposed sides includes a retainer selectively engaging and retaining the cover member.

6. A wireway according to claim 3, wherein the cover member includes an extension having a first section extending obliquely downward from the planar portion and a second section extending obliquely downward from the first section substantially perpendicular to the planar portion.

7. A wireway according to claim 2, wherein alternating cover members include end portions overlapping ends of adjacent cover members.

8. A wireway according to claim 2, wherein the cover member and hinge comprise a monolithic element.

9. A wireway, comprising:
   at least one channel member connectable to other like channel members in an end to end configuration, wherein the channel member includes two sides and a bottom forming a substantially rectangular channel, a hook member extending outward from each side at a first end of the channel member; a slot formed in each side at a second end of the channel member configured for receiving a hook member;
   a cover hingedly mounted to the channel members.

10. A wireway according to claim 9, wherein the second end of each of the channel members includes an offset portion spaced laterally outward from each side, wherein the slots are located at the offset portion.

11. A wireway according to claim 10, wherein the slots extend substantially perpendicular to the bottom.

12. A wireway according to claim 10, further comprising first depressions formed in the bottom.

13. A wireway according to claim 12, further comprising second depressions formed in the offset portion aligned with the first depressions when the channel members are connected.

14. A wireway, comprising:

a plurality of channel members connected in an end to end configuration, wherein each channel member includes two sides and a bottom forming a substantially rectangular channel, a hook member extending outward from each side at a first end of each channel member; a slot formed in each side at a second end of each channel member configured for receiving a hook member;

one or more cover members pivotally connected to a first flange for movement between an open position and a closed position, the cover member including a hinge element extending through the first flange and engaging the first one of the opposed sides in the open position to limit rotation of the cover member.

15. A wireway according to claim 14, wherein the cover member and hinge comprise a monolithic element.

16. A wireway according to claim 14, wherein the second end of each of the channel members includes a complementary offset portion spaced laterally outward from each side, wherein the slots are located at the offset portion.

17. A wireway according to claim 14, wherein the cover includes a planar center portion and a mounting portion extending obliquely downward from the planar center portion.

18. A wireway according to claim 17, wherein the hinge element includes a first section extending obliquely to the mounting portion and a second section extending obliquely from the first section and engaging the one of the sides.

19. A wireway according to claim 16, wherein the slots extend substantially perpendicular to the bottom.

20. A wireway according to claim 16, further comprising first depressions formed in the bottom, and second depressions formed in the offset portion aligned with the first depressions when the channel members are connected.

21. A wireway according to claim 14, wherein the hinge portion of the cover member is formed to be supported and self-retained on the first flange and engage one of the sides of the channel in an open position.

* * * * *